Figures 1, 2:
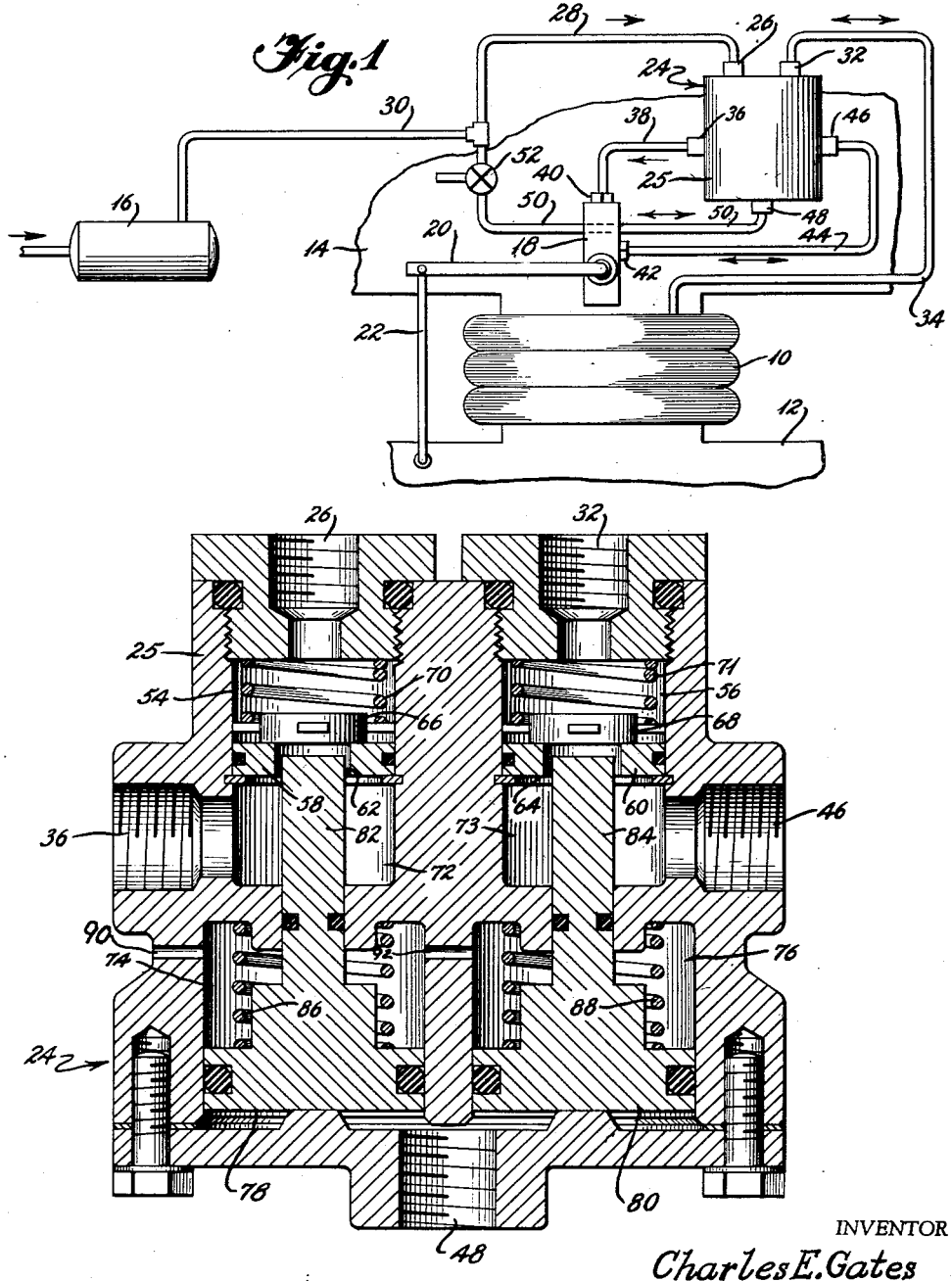

March 20, 1962 C. E. GATES 3,026,103
VALVE MECHANISM FOR VEHICLE AIR SPRINGS
Filed April 20, 1959

INVENTOR
Charles E. Gates
BY Scrivener & Parker
ATTORNEYS

United States Patent Office 3,026,103
Patented Mar. 20, 1962

3,026,103
VALVE MECHANISM FOR VEHICLE AIR SPRINGS
Charles E. Gates, Elyria, Ohio, assignor to Bendix-Westinghouse Automotive Air Brake Company, Elyria, Ohio, a corporation of Delaware
Filed Apr. 20, 1959, Ser. No. 807,543
3 Claims. (Cl. 267—65)

This invention relates to motor vehicle air spring suspension systems and more particularly to an improved control valve mechanism for controlling the leveling action of the vehicle frame in response to changes in load conditions.

Air spring suspension systems for vehicles which include an air cushion bellows or the like between a vehicle frame and axle utilize control or leveling valves usually carried on the vehicle frame and connected to the vehicle axle by a linkage and lever system such that when the load in the vehicle changes the lever is oscillated by the linkage to operate the leveling valve to admit or exhaust fluid pressure to or from the air springs depending on whether the load on the vehicle is increased or decreased, the flow of fluid pressure continuing until the frame is moved to an established level wherein the leveling valve is lapped and further flow of fluid pressure is stopped. The above described system is old and in such systems it has been frequently proposed to add a cut-off valve responsive to brake application or to door-opening to connect the air spring and the leveling valve only at such time as the brake is applied or the door opened. The chief purpose of the cut-out valve is to conserve air during over-the-road operation where the level of the vehicle having been once established, further leveling is not required until such time as the vehicle is stopped and the load would normally be expected to change.

Though systems of this type effectively conserve the relatively large quantities of air that would flow to or from the air spring, no provision is made for also isolating the control device from the source of air supply. Hence, during over-the-road operation the control device continues to admit or exhaust air to or from that much of the system that is between the cut-off valve and the control device and though the quantities of air involved in this are not large, the amount that flows is continuous so that the source is being constantly depleted through the control device requiring the compressor to operate in loaded condition, with consequent wear and tear, longer than would be required if the control device were also disconnected from the source at the same time as the bellows or air spring is disconnected from the control device.

An object, therefore, of the present invention is to eliminate the disadvantages of prior air spring systems.

Still another object of the invention is to provide in an air-spring system employing a supply source of air pressure, a bellows or the like and a control device between the source and the bellows, means for conserving air in the entire system by disconnecting during predetermined periods the control device from both the air supply and the bellows so that the control device cannot in any way deplete air from either the spring or from the supply.

Other objects and their attendant advantages will become apparent as the following detailed description is read in conjunction with the accompanying drawings wherein:

FIG. 1 is a diagrammatic view of a system employing the features of the present invention; and FIG. 2 is vertical cross-sectional view of valve mechanism which may be employed in the system of FIG. 1.

Referring to FIG. 1, the system there shown comprises a conventional air spring or bellows 10 interposed between an axle 12 and the frame 14 of a vehicle. The air spring is supplied with air from a reservoir 16 with the flow of air to and from the air spring governed by a control device responsive to vehicle loading. The control device illustrated comprises a conventional leveling valve 18 carried on the vehicle frame and connected to the axle by means of a lever 20 and link 22. The leveling valve operates in the usual manner wherein increased vehicle loading depresses the air spring 10 causing lever 20 to be moved clockwise in FIG. 1 so as to operate valve 18 to admit air pressure from reservoir 16 to bellows 10 which then expands until the lever 20 is moved to a neutral position thus lapping valve 18. Decrease in vehicle loading has the reverse effect wherein the air spring expands to cause lever 20 to move counterclockwise so as to operate valve 18 to connect the air spring to atmosphere which then deflates until the lever is again in its neutral or lap position.

The system as above described is in all respects conventional. In accordance with the invention, means are provided for cutting off air flow between the leveling valve and both the reservoir 16 and air spring 10 except during predetermined periods of vehicle operation. The means provided for accomplishing the foregoing comprises a valve mechanism indicated generally by the numeral 24. The mechanism includes a housing 25 connected to reservoir 16 through a port 26 and conduits 28, 30. The mechanism 24 is also connected to the air spring 10 by a port 32 and conduit 34 and is connected by a port 36 and conduit 38 to the supply port 40 of the leveling valve 18, whose combined inlet and exhaust port 42 is connected by a conduit 44 to a corresponding port 46 in the housing 25. The latter is also provided with a control port 48 through the bottom thereof which is connected to the reservoir conduit 30 by a conduit 50 containing a three-way control valve 52. The valve 52 may be any one of a variety of types which may be moved to one position to connect conduits 30, 50 to admit reservoir pressure to control port 48 or to a second position disconnecting conduits 30, 50 while simultaneously connecting the latter to atmosphere to exhaust reservoir pressure from the control port 48.

In accordance with the invention and as will become more fully apparent hereinafter, when control pressure is admitted to control port 48, the system is conditioned for leveling operation but when control pressure is exhausted from port 48 the entire system is deactivated so that no air flows between the reservoir, the leveling valve and air spring. Desirably, control pressure flows to mechanism 24 only when the vehicle is stopped or a door is opened and the vehicle loading is likely to change. At other times and particularly while the vehicle is traveling over-the-road the system is desirably deactivated so that air will be conserved throughout the entire system. Thus the three-way valve 52 may be any one of a variety which is operable by mechanical, electrical or pressure means to connect or disconnect the control port and the reservoir in response to a predetermined condition, as for example, to the opening of a door.

Referring now to FIG. 2, the valve mechanism 24 comprises the aforementioned body member 25 whose interior is divided into two identical but separate cavities 54, 56 respectively connected to the reservoir through port 26 and to the air spring through port 32. Contained within the cavities are fixed abutments 58, 60 having ports 62, 64 therethrough, each respectively controlled by a check valve 66, 68 normally urged by springs 70, 71 to position closing the ports 62, 64. These latter communicate with lower cavities 72, 73 and their respective ports 36, 46 which are connected respectively to the supply port 40 and to the combined inlet and exhaust port 42 of the leveling valve 18.

The lower part of the body member 25 is divided into two identical chambers 74, 76 containing respectively pistons 78, 80 which divide the chambers into upper and lower portions, the upper portion of the chamber being open to atmosphere by way of vent ports 90 and 92. The pistons 78, 80 have integral upstanding plungers 82, 84 extending into the cavities 72, 73 in axial alignment with the check valves 66, 68. Springs 86, 88 bear respectively on the piston 78, 80 to maintain them in a normal lower position with the plungers 82, 84 out of engagement with the respective check valves 66, 68. The lower sides of the pistons 78, 80 are in open communication with each other and with the control port 48 so that when control fluid pressure is admitted to the control port it flows simultaneously to both piston chambers 74, 76 to move both the pistons upwardly together thereby opening simultaneously the check valves 66, 68.

In operation, with the three-way valve 52 assumed to be in a position in which control port 48 is connected to atmosphere and the air spring charged, with the leveling valve in its neutral or lapped position, the parts of the valve mechanism 24 assume the position of FIG. 2 in which the check valves 66, 68 are closed so that reservoir 16 is disconnected from the supply port 40 of the leveling valve 18 and the air spring 10 is disconnected from the combined inlet and exhaust port 42 of the leveling valve. As the vehicle travels over-the-road, the lever 20 is naturally oscillated to operate the leveling valve. However, since the leveling valve is not supplied with air nor connected to the air spring, no air is transferred through the system.

Assuming now that the vehicle is stopped and that the valve 52 operates in response to door opening and closing. When the door is opened, the valve 52 is moved to a position connecting conduits 50, 30 to admit reservoir pressure to control port 48. Upon this occurrence, both pistons 78, 80 are moved upwardly to unseat valves 66, 68. When valve 66 is opened, reservoir pressure is admitted via conduit 28, port 26, cavities 54, 72, and port 36 to the supply port 40 of the leveling valve. Assuming the lever 20 is in its neutral or lap position, the air supplied to port 40 travels no further until leveling action is required. When check valve 68 is opened, the air pressure in the air spring 10 flows by way of port 32, cavities 56, 73 and port 46 to the supply and exhaust port 42 in the leveling valve.

Assume now that the load in the vehicle changes as by the arrival or departure of a passenger. Upon this occurrence, the lever is oscillated in one direction or the other either to connect supply port 40 to inlet and exhaust port 42 or to connect the latter to atmosphere depending on whether the load is increased or decreased. Regardless of which, the air spring either expands or deflates in the normal manner until the lever 20 is again in its neutral or lap position and further flow of air pressure stops.

Assume now that the door is closed. Upon this occurrence the valve 52 is moved to a position disconnecting conduits 30 and 50 and connecting the latter to atmosphere thereby exhausting control pressure from the piston cavities 74, 76 so that the pistons 78, 80 return to the position of FIG. 2 and check valves 66, 68 close to isolate the leveling valve from both the supply reservoir and the air spring.

Though the valve of the invention has been described as being responsive to control pressures determined by door opening or by brake application, it will be apparent to those skilled in the art that the valve could also be responsive to compressor unloading pressure under the control of a fluid pressure governor. Regardless of the arrangement employed, the normal position of the check valves is their closed position. Where the valves are unloader controlled the pistons could be spring urged upwardly, instead of downwardly as shown, with unloader pressure acting on the pistons to maintain them in a down position with the check valves closed. During the periods when the compressor is loaded by exhaustion of fluid pressure from the unloader, fluid pressure is simultaneously exhausted from the piston chambers permitting the pistons to rise upwardly to open the check valves and condition the system for leveling action.

It will be apparent to those skilled in the art that the system and valve means of the invention is susceptible of a variety of modifications without, however, departing from the scope and spirit of the appended claims.

What is claimed is:

1. In combination with an air suspension system for a vehicle including a pressure reservoir, leveling valve and air spring, control valve mechanism interconnecting said reservoir, leveling valve and air spring and comprising a body member having a fluid passage therein affording a connection between said reservoir and said leveling valve, a second fluid passage in said body member affording a connection between said leveling valve and said air spring, a normally closed check valve in each of said fluid passages, fluid pressure responsive control means in said body for moving said check valves from their normal positions to their open position, and other valve means connected between said reservoir and said body member for admitting or exhausting fluid pressure to or from said control means so that said check valves are moved simultaneously between their open and closed positions.

2. The combination of claim 1 wherein said control means comprise a pair of pistons each having a plunger in axial alignment with said check valves, and a control port in said body affording a common fluid connection between said pistons and said other valve means.

3. In combination with an air suspension system for a vehicle including an interconnected pressure reservoir, a leveling valve and an air spring, normally closed valve means in the connection between said reservoir and said leveling valve, normally closed valve means in the connection between said leveling valve and said air spring, and a fluid pressure responsive device operatively associated with both of said valve means and responsive to the periodic flow of fluid pressure to and from said device for simultaneously operating both of said valve means.

References Cited in the file of this patent

UNITED STATES PATENTS

| | | |
|---|---|---|
| 1,555,199 | Gouirand | Sept. 29, 1925 |
| 2,380,827 | Downs | July 31, 1945 |
| 2,787,475 | Jackson | Apr. 2, 1957 |
| 2,891,577 | Stewart | June 23, 1959 |
| 2,925,284 | Szostak et al. | Feb. 16, 1960 |
| 2,947,531 | Deist | Aug. 2, 1960 |